United States Patent
Lamon et al.

(10) Patent No.: US 7,307,520 B2
(45) Date of Patent: Dec. 11, 2007

(54) SYSTEMS AND METHODS FOR DIRECT CURRENT SYSTEM DIGITAL CARRIED MESSAGE CONVEYANCE

(76) Inventors: Keith Lamon, W1451 Cardiff La., Ixonia, WI (US) 53036; Brad Rake, 3794 Elmwood Rd., Hubertus, WI (US) 53033

( * ) Notice: Subject to any disclaimer, the term of this patent is extended or adjusted under 35 U.S.C. 154(b) by 0 days.

(21) Appl. No.: 11/227,376

(22) Filed: Sep. 15, 2005

(65) Prior Publication Data

US 2006/0071552 A1 Apr. 6, 2006

Related U.S. Application Data

(60) Provisional application No. 60/611,235, filed on Sep. 17, 2004.

(51) Int. Cl.
*B60Q 1/00* (2006.01)
(52) U.S. Cl. ............. 340/538; 340/538.12; 340/310.13
(58) Field of Classification Search ........... 340/310.01, 340/310.02, 310.03, 310.04, 310.05, 310.06, 340/310.07, 310.08, 310.12, 310.13, 431, 340/310.15, 310.16, 310.17, 428, 538, 538.12, 340/538.14, 538.15, 538.16; 315/315, 317; 701/1
See application file for complete search history.

(56) References Cited

U.S. PATENT DOCUMENTS

| | | | |
|---|---|---|---|
| 4,523,307 A | 6/1985 | Brown et al. ................ 370/260 |
| 4,639,609 A | 1/1987 | Floyd et al. ................ 307/10.1 |
| 4,749,992 A | 6/1988 | Fitzemeyer et al. ... 340/870.02 |
| 5,142,278 A | 8/1992 | Moallemi et al. ........... 340/436 |
| 5,488,352 A | 1/1996 | Jasper ......................... 340/431 |
| 5,694,109 A | 12/1997 | Nguyen et al. ......... 340/310.12 |
| 5,739,592 A | 4/1998 | Rigsby et al. ............... 307/9.1 |
| 5,745,027 A | 4/1998 | Malville ................... 340/310.1 |
| 5,812,557 A * | 9/1998 | Stewart et al. ............... 714/712 |
| 5,900,803 A | 5/1999 | Politz et al. ............. 340/425.5 |
| 6,006,143 A | 12/1999 | Bartel et al. .................... 701/1 |
| 6,127,939 A | 10/2000 | Lesesky et al. ............. 340/438 |
| 6,229,432 B1 * | 5/2001 | Fridley et al. ......... 340/310.14 |
| 6,229,434 B1 | 5/2001 | Knapp et al. .......... 340/310.16 |
| 6,356,426 B1 | 3/2002 | Dougherty .................. 361/102 |
| 6,373,377 B1 * | 4/2002 | Sacca et al. ................. 375/257 |
| 6,392,368 B1 * | 5/2002 | Deller et al. ................. 315/317 |
| 6,400,103 B1 | 6/2002 | Adamson ..................... 315/292 |
| 6,411,203 B1 | 6/2002 | Lesesky et al. ............. 340/431 |
| 6,507,158 B1 | 1/2003 | Wang .......................... 315/294 |
| 6,512,307 B1 | 1/2003 | Ilg ............................... 307/9.1 |
| 6,608,554 B2 | 8/2003 | Lesesky et al. ............. 340/431 |
| 6,744,352 B2 | 6/2004 | Lesesky et al. ............. 340/431 |

(Continued)

FOREIGN PATENT DOCUMENTS

EP 0 659 613 5/1995

(Continued)

*Primary Examiner*—Van T. Trieu
(74) *Attorney, Agent, or Firm*—Ryan Kromholz and Manion

(57) ABSTRACT

The systems and methods of the present invention provide for conductive emissions communication without requiring dedicated communications wires. The systems and methods have the capability to send digital messages over the same wires that are used to power DC systems. Hardware filter circuits are combined with advanced algorithms in a communications control chip to permit the elimination of the dedicated wires, thereby needing zero additional wires to accomplish the task of digital control.

12 Claims, 6 Drawing Sheets

U.S. PATENT DOCUMENTS

| | | | |
|---|---|---|---|
| 6,759,946 B2 | 7/2004 | Sahinoglu et al. | 340/310.11 |
| 6,799,814 B2 | 10/2004 | Lesesky et al. | 303/122.02 |
| 6,800,957 B2 | 10/2004 | Nerone et al. | 307/9.1 |
| 6,842,668 B2 | 1/2005 | Carson et al. | 700/286 |
| 6,970,772 B2 * | 11/2005 | Radtke et al. | 701/1 |
| 7,042,339 B2 * | 5/2006 | Bruccoleri et al. | 340/310.13 |

FOREIGN PATENT DOCUMENTS

| | | | |
|---|---|---|---|
| EP | 1 383 280 | | 1/2004 |
| JP | 02005123960 A | * | 5/2005 |
| WO | WO 02/052745 | | 7/2002 |
| WO | WO 2004/055994 | | 7/2004 |

* cited by examiner

SYSTEMS AND METHODS FOR DIRECT CURRENT SYSTEM DIGITAL CARRIED MESSAGE CONVEYANCE

RELATED APPLICATIONS

This application claims the benefit of U.S. Provisional Patent Application Ser. No. 60/611,235, filed 17 Sep. 2004, and entitled "Systems and Methods for Direct Current System Digital Carried Message Conveyance."

FIELD OF THE INVENTION

This invention relates generally to digital communication systems. In particular, this invention relates to direct current conductive emissions communications systems.

BACKGROUND OF THE INVENTION

Many forms of digital communications used today require separate wires to carry the digital messages from one place to another. The only exception to this trend is RF (Radio Frequency) based systems. Systems employing RF technology transmit a radio signal through the air in the same manner as a cellular phone.

When a non-RF system uses dedicated wires for communications, those wires are often referred to collectively as the "communications bus." A communications bus refers to a group of wires whose responsibility it is to get information from the source to the intended receiver or from the receiver to the source. The reason that is done is to denote the fact that those wires are acting as a stand-alone sub-system and must be isolated from other sub-systems. In more complex systems it is possible to have several communications buses. This would become necessary if the different communications sub-systems were incompatible and the digital information being conveyed by one sub-system would interfere with the operation of another sub-system.

FIG. 1 is an illustration of a simple prior art communications bus system that might be encountered in a mobile DC (Direct Current) application. This type of system is referred to as using conducted signals or emissions. This means the signal itself is following a conductive path, e.g., a conductive wire of the communications bus. This results in a more controlled message path, a message that can work at low power levels and reduced chances of the signal interfering with other electronic devices.

Conducted emission systems to date have had one distinct disadvantage. A conductive path can also carry many types of noise. This noise can come from many sources. Examples would be a motor, solenoid, generator or certain types of lights. Radiated emissions of sufficient power can also attach themselves to a conductive path.

One prior art type of communications method that is gaining in popularity is the Radio Frequency (RF) system, as shown in FIG. 2. As explained previously, this works in much the same manner as a cellular phone.

RF systems use what is referred to as a radiated transmission or emission. That type of signal is intentionally transmitted into the air surrounding an antenna in all directions. Radiated emission devices are tightly controlled by the FCC (Federal Communications Commission) due to their tendency to interfere with other electronic devices. Conventional RF devices must transmit within well-defined ranges of frequencies that have been established by the FCC. Most of the FCC frequencies require a license to operate a transmitting device. There are specific frequencies set aside for low power devices such as the ones used in the RF devices currently being discussed. These devices collectively are sometimes referred to as "Part 15" devices as that is the section of the FCC rules they operate within.

To initiate a RF system, an input device receives information from a pre-determined source. This could vary from a sensor monitoring a certain parameter to a switch sending a "go" or "stop" command. Once the incoming information is recognized, the input controller generates a message for transmission. The input controller would then broadcast that coded message through the air to all other controllers in the system. One disadvantage to this scheme is that any electronic device capable of receiving air-born messages and in close proximity to the transmitting device would also receive the message.

In order to minimize the possibility of an unintended device responding to an incoming message the originating controller would encode the message with a special recognition number. To further reduce the possibility of miscommunication, some systems employ what is referred to as a Spread Spectrum Frequency Hopping communications scheme. What that means is that instead of broadcasting on only one frequency, the controller sends out portions of its message on different frequencies. The receiving device must be directed to know what frequency to start at and what other frequencies to hop to as the incoming message progresses.

The need remains for simplified digital communication systems and methods that do not require dedicated communications wires and that send digital messages over the same wires that are used to power DC systems.

SUMMARY OF THE INVENTION

It is an object of this invention to provide digital communication systems and methods that do not require dedicated communications wires.

It is also an object of this invention to provide systems and methods that send digital messages over the same wires that are used to power DC systems, thereby eliminating the dedicated wires and requiring zero additional wires to accomplish the task of digital control.

These and other objects of the invention are achieved by providing a communications system comprising an input device and an output device. The input device is coupled to a power source of the load power bus. The output device is coupled to the input device and to a load by the load power bus and to the power source by a return power bus. The output device comprises a filter, a receive detector, a controller, a transmit driver, and a main processor.

The filter receives a command signal of a pre-determined frequency transmitted by the input device over the load power bus and filters signals that are not of the pre-determined frequency. The receive detector receives signals from the filter and determines if the signals match the pre-determined frequency and outputs a signal of the pre-determined frequency corresponding to the command. The controller receives the command from the receive detector and processes the command in serial code. The transmit driver is located downstream of the controller and prepares messages received from the controller for injection back into the load power bus. The main processor receives the message from the controller.

According to one aspect of the invention, the system is a direct current (DC) system.

According to another aspect of the invention, the machine code comprises a group of three Bytes.

Objects of the invention are also achieved by providing a conductive emissions communications system comprising an input device, an output device communicatively coupled to the input device by a power line, a load controlled by the output device, and means for transmitting a command signal from the input device to the output device over the power line without the use of a designated communications line. The output device includes means for recognizing the command signal transmitted by the input device, means for filtering interfering signals, and means for controlling the load based on the command signal without the interfering signals.

According to one aspect of the invention, the system is a direct current (DC) system.

According to another aspect of the invention, the output device includes means for processing the command signal in serial code.

Objects of the invention are also achieved by a method of transmitting a digital communication comprising transmitting a command signal directly over a power line from an input device, through an output device, and to a load without the use of a designated communications line. According to one aspect of the invention, the power line is part of a direct current (DC) system.

According to another aspect of the invention, the output device includes means for processing the command signal's serial code.

According to another aspect of the invention, interfering signals are filtered from the command signal.

DESCRIPTION OF THE PREFERRED EMBODIMENT

Figure 1:
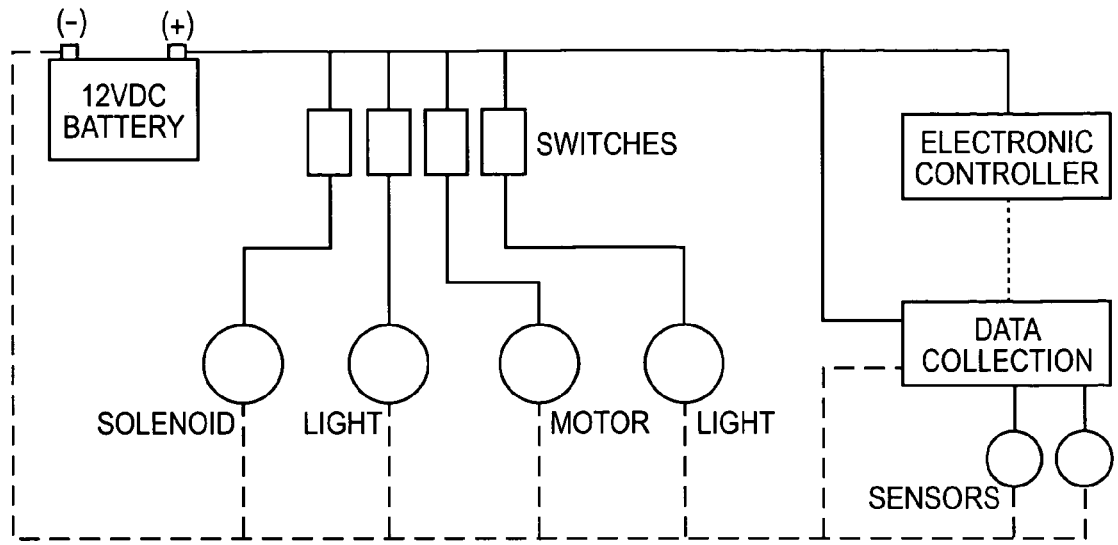
FIG. 1 is a schematic drawing of a prior art conductive emissions communications system having a dedicated communications bus for transmitting a signal.
Figure 2:
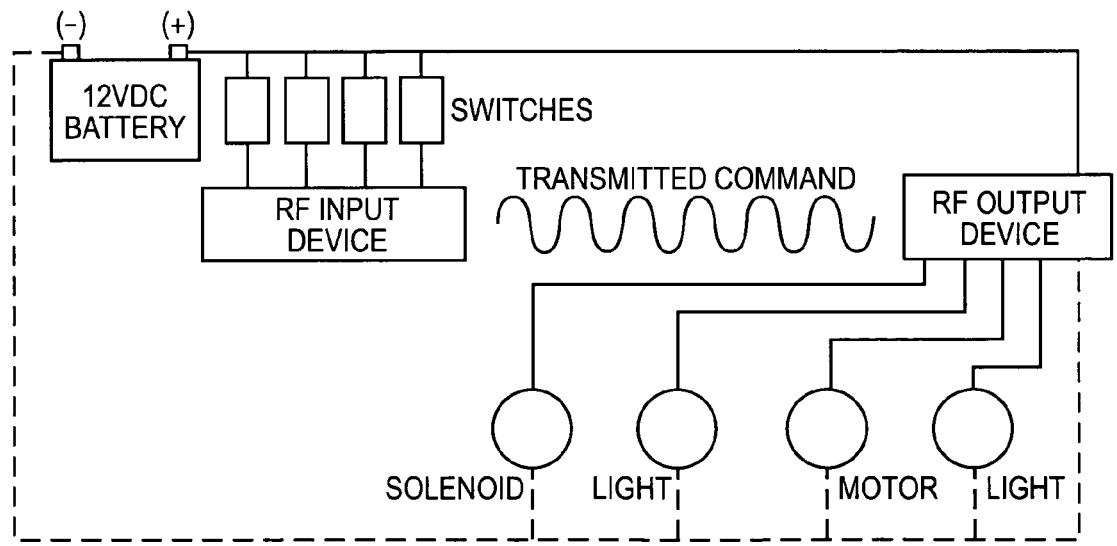
FIG. 2 is a schematic drawing of a prior art radio frequency communications system.

Although the disclosure hereof is detailed and exact to enable those skilled in the art to practice the invention, the physical embodiments herein disclosed merely exemplify the invention, which may be embodied in other specific structures. While the preferred embodiment has been described, the details may be changed without departing from the invention.

It is useful for the purposes of this disclosure to have an understanding of terms commonly used in reference to communications systems.

Serial or Parallel refers to the way in which the information is sent out. In a parallel system, different parts of a message stream are sent over different wires. Computer printers to this day still use a parallel communications scheme. These types of systems can transmit at very high speeds but require many more wires to accomplish the task. In a serial scheme, all of the data is sent out in one stream, one part of the message stacked behind the other. This results in processing at slower speeds but using much fewer wires.

Baud rate is the same as the term bps (Bits Per Second). The term baud rate applies to an analog system (i.e., a modem or phone line based system). The term bps refers to a digital system.

Twisted pair wires is a term used to describe a method of reducing the influence of external electrical noise on two wires. When you twist two wires together, the strength of the noise riding on the wires tends to be lessened, or attenuated, where the lines cross each other. This is a less expensive way of trying to eliminate noise as opposed to shielded cable. With shielded cable, a conductive foil wrap actually surrounds the wires and is also wrapped over a bare conductor. The bare conductor acts as a drain for the foil shield when one of its ends is connected to ground.

Synchronous is a term used to describe when a communications system is controlled by a timing clock. If the system is asynchronous a clock does not control it. The systems and methods of the present invention are preferably synchronous.

Bi-directional means the system can send messages in both directions as opposed to uni-directional. The systems and methods of the present invention are preferably bi-directional.

Master-Slave or Peer to Peer. These two terms describe whether a system has one controller that is responsible for the control of a communications system (Master-Slave) or if each controller (processor) can access the system (Peer to Peer).

I. System Overview

In reality all systems in use today, RF or otherwise, attempt to achieve two things: 1) to reduce the number of wires required activating a load of some sort; and 2) moving digital information.

An RF system uses a radio message transmitted from an input module to tell a receiver output module what needs to be done or what information is being passed. This in essence, replaces the dedicated communication wires that used to run from the control device, such as a switch, to the controlled load or from one controller to another.

Figure 3:
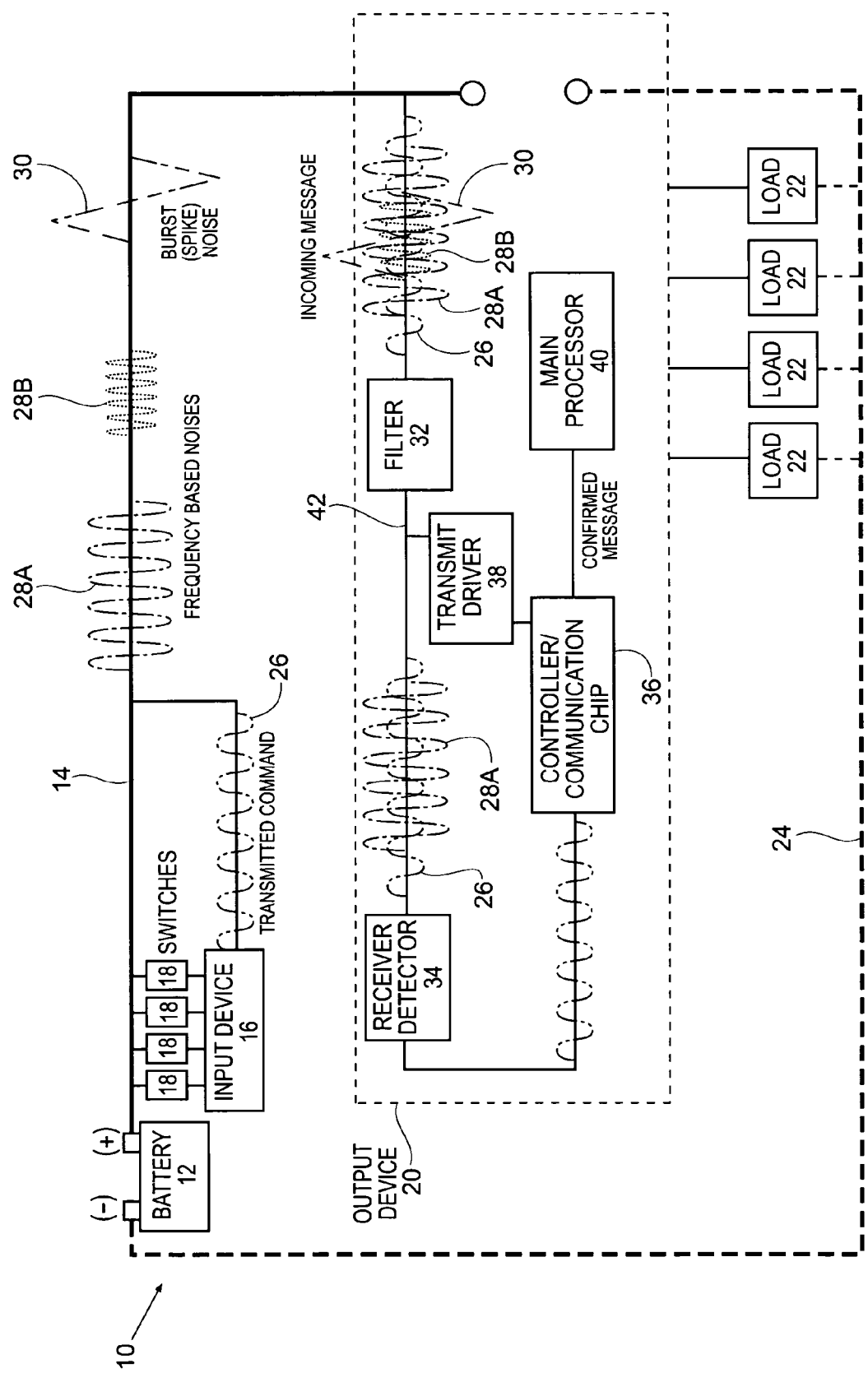
FIG. 3 is a schematic drawing of a conductive emissions communications system that permits transmission of a command signal directly over a power bus.

FIG. 3 illustrates a conductive emissions communications system 10 that also replaces those same wires and sends information, thereby eliminating the need for dedicated communication bus wires.

The system 10 includes a power source, e.g., a conventional direct current (DC) 12-volt battery 12. A load power bus 14 provides voltage and current from the battery 12 to an input device 16 (by way of a series of switches 18), to an output device 20, and from the output device 20 to one or more loads 22. By way of illustration, in an automobile, a load 22 may take the form of a light, a motor, a horn, a solenoid, or any other component requiring activation and/or deactivation. A return bus 24 provides voltage and power back to the battery 12 from the output device 20.

Instead of transmitting a signal through the air like a RF system, the system 10 injects a message or transmitted command 26 directly onto the load power bus 14. That is, the power handling capability of the power bus 14 is multiplexed in combination with signal transmission. The power and return buses 14 and 24 define a two-conductor cable (e.g., black and red) system. Instead of a bundled harness for each command, only the power 14 and return 24 cables are required. As only two cables need to be checked/verified or replaced, troubleshooting and diagnostics are greatly simplified.

As was discussed earlier, a conductive emissions communications system is more apt to be affected by electrical noise from other devices. One common type of noise is spurious frequency noise. Two different spurious frequency noises, denoted 28A and 28B to designate different frequencies, are shown in FIG. 3. Burst noise 30 is normally classified as non-cyclical momentary electrical voltage deviations (positive or negative) and are often referred to as spikes.

The output device includes a filter 32, a receive detector 34, a controller 36 (e.g., communications chip), a transmit driver 38, and a main processor 40, which communicate by way of a power line 42, which run in parallel to the power line 42, thus eliminating bulky series filter elements. Together, these components enable the system 10 to withstand the burst 30 and spurious frequency noises 28A and 28B normally associated with low voltage DC systems.

A first group of cooperating components form the filter 32, which may be connected via a capacitor to the power line 42. The filter 32 acts to block signals that are not of a desired or proper frequency or that otherwise do not match predetermined criteria. The filter 32 is preferably designed to work at a Center Frequency of 1.79 MHz. The Center Frequency is the midpoint of the range of frequencies, or bandwidth, that a filter will pass. This is equal to 1,790,000 Hertz or cycles per second. In a preferred embodiment, the filter 32 is an arrangement of various components commonly used in filter circuits and available from many manufacturers.

A second group of cooperating components form the receive detect network 34. The network 34 monitors signals that have passed through the filter 32 to determine if they match the desired frequency.

A third group of cooperating components form the transmit driver 38. The driver 38 prepares messages from the controller 36 for injection onto the power line 42. In the illustrated and preferred embodiment, the driver 38 is located on the downstream side of the controller 36. After an outgoing signal has passed through the controller 36, it is sent back through the filter 32 and onto the power line 14 as verification of receipt and transmission of the command signal 26.

The controller 36 contains the software that determines if the signal sent through the receive detector 34 is valid. If it is a valid signal, the information will be decoded and stored in a message buffer. The main processor 40 is then notified that a new message has come in.

The controller 36 utilizes a communications processor chip along with a specialized circuit board design that minimizes interference found in low voltage DC circuits. In a preferred embodiment, the controller 36 is a very large-scale integration (VLSI) device, such as model QDC10 available from Yamar Electronic, Ltd., of Tel Aviv, Israel.

The controller 36 and processor 40 use advanced algorithms to decode and process the command 26. All computers are nothing more than a group of switches. These switches can only be either on or off. That being the case there are only two electrical voltage conditions that can exist, energized (Hi) or de-energized (Low).

This means that any computer or digital device must communicate in a binary language. A binary language has two characters to work with and the characters are typically 0 (Electrically Low) or 1 (Electrically Hi). No matter how complicated a device may be, it still works with a simple binary language. Binary language is also known as machine code.

Processors can only work with a fixed number of 1's and 0's at a time. For many years, processors used blocks of 8 characters of 1's or 0's. An individual 1 or 0 is called a Bit. A collection of 8 bits is called a Byte, 4 bits is called a Half Byte. 16 bits is known as a Word and 32 bits is referred to as a Double Word. In recent years, processors have progressed to the point where it possible to rapidly manipulate 16 bits or 32 bits at a time.

Software in each independent electronic module communicates to other modules in a typical system using synchronous (clocked) serial messages. The communications network is bi-directional (sends and receives) in nature. Messages are constructed using a unique "group number" approach. One byte in each message is reserved for a group number. As all messages are broadcast to every module in a system, the group number tells each module if a particular message is meant for that module. The number also pre-qualifies a message for internal processing by the intended recipient. The system format is a combination of Peer-to-Peer and Master-Slave. As with a typical Peer-to-Peer system, each module can transmit a message without direction from the Master. To help prevent collisions on the communications network, each module is assigned a transmit slot number. When a module has a message to send, it must wait for its slot number to come up. The timing for the transmit slot is controlled by an internal timer built into each module. The Master polls the other modules in the system and can override any modules' command in the event of a fault situation.

The illustrated system 10 uses a group of 3 Bytes or 24 Bits of binary information.

Example of possible message of the systems and methods of the present invention:

| Byte 1 |
|---|
| 1 1 1 1 1 1 1 0<br>Prepare to transmit<br>3 Byte long message |

| Byte 2 |
|---|
| 0 0 0 0 0 0 1 0<br>Message is for Group 2<br>(On/Off function) |

| Byte 3 |
|---|
| 0 0 0 0 0 0 0 1<br>Turn "On" Group 2 function |

The Group format method of message construction not only allows the systems and methods of the present invention to transmit complex messages with a minimum number of Bytes, it also allows for expansion and flexibility beyond the limitations of other message construction techniques.

When a message is sent out it has to have a specific target. Normally, this is accomplished by assigning a unique address to each potential target. This is very limiting however, if one of the goals of the system is to keep message length (total number of Bytes) to a minimum.

The Group format expands the capabilities of a single Byte of information by accounting for the normally encountered redundancies in most applications. Instead of assigning a specific address to each target, groups are formed of targets that always respond together to a specific command.

For example, in an automotive application, both headlights are normally turned on or off at the same time. Instead of targeting a message to each headlight, they can be grouped together so that one group command can operate both headlights. If an operator wishes to turn on only one headlight, the same group number can be used, but the command is changed to turn on only one headlight.

As another example, in many hydraulic applications it becomes necessary to activate multiple valves simultaneously. An operator may use the Group format and simply assign each valve grouping a separate group number. If there were a particular valve that is a member of multiple groups, then the processor output terminal for that valve would be assigned all of the group numbers required.

The software permits a variety of customized functions to be programmed. For example, lights can be programmed to be flashers or multiple motors may be simultaneously activated to allow a car seat to move forward and up at the same time with one switch. Customized safety features may also be programmed, e.g., to require a designated function or pass code before a switch can be activated. Diagnostics software greatly simplifies troubleshooting. For example, diagnostic functions can monitor loads and broadcast fault conditions to aid in diagnosing short conditions.

If increased communication speed is necessary, an additional small processor (not shown) may be provided to act as a buffer between the communications chip 36 and the main processor 40. The additional processor would desirably monitor the communications chip 36, store new messages, and transfer messages between the main processor 40 and the communications chip 36.

II. Use of the System

In use, an operator uses switches 18 to input a selected function into the input device 16. The input device 16 transmits the command 26 corresponding to the selected function onto the load power bus 14 for transmission to the output device 20. The command 26 is a signal transmitted as a pre-determined frequency or frequencies. As FIG. 3 illustrates, frequency-based noises 28A/28B and burst noise 30 may also be present on the load power bus 14 along with the desired command 26 to the controller 20 and thereby mask, disrupt, or otherwise interfere with the command signal 26.

The filter 32 receives the command 26 as transmitted by the input device 16 and filters interfering signals that are not of the pre-determined frequency. The filter 32 then transmits the "filtered" signals to the receive detector 34. In some cases, the filter 32 may not be able to remove all interfering noises. For example, FIG. 3 illustrates a situation in which the filter 32 has removed the burst noise 30 and frequency-based noise 28B. However, the filtered signals still retain frequency-based noise 28A along with the command signal 26.

The receive detector 34 receives the signals from the filter 32 and determines if the signals match the pre-determined frequency corresponding to the command signal 26. In the illustrated example, the receive detector 34 recognizes that the noise 28B does not correspond to any pre-determined frequency and disregards the noise signal 28B. The receive detector also recognizes the command signal 26 as corresponding to a pre-determined frequency and outputs the command 26 to the controller 36.

The controller 36 receives the command 26 from the receive detector 34 and decodes and processes the command 26 in binary language comprising a Group of three Bytes, as previously described. The controller 36 then transmits the confirmed message to the main processor 40.

III. Representative Applications

One of the significant features of the systems and methods of the present invention is the relative ease of custom configuration for varied applications in multiple markets. The systems and methods of the present invention are built on a modular design platform so many applications can be accomplished with minimal development time. The system 10 is inherently reliable through the utilization of commonly used components.

Automotive:

Mainstream: At the time of manufacturing, vehicles may be equipped by the manufacturer with individual controls and indicators for security systems, interior & exterior lights, sound & video systems, climate control, and various options available on the vehicle.

Aftermarket: Available in standard modules, customers (e.g., car rebuild shops, actual end-users) may purchase the modules they need for their specific requirements. Modules would be designed to interface with aftermarket "kits" so that features like electric windows, security systems and custom lighting could be easily added to older vehicles. Modules would also interface with aftermarket or original equipment monitoring and control systems.

Figure 4:
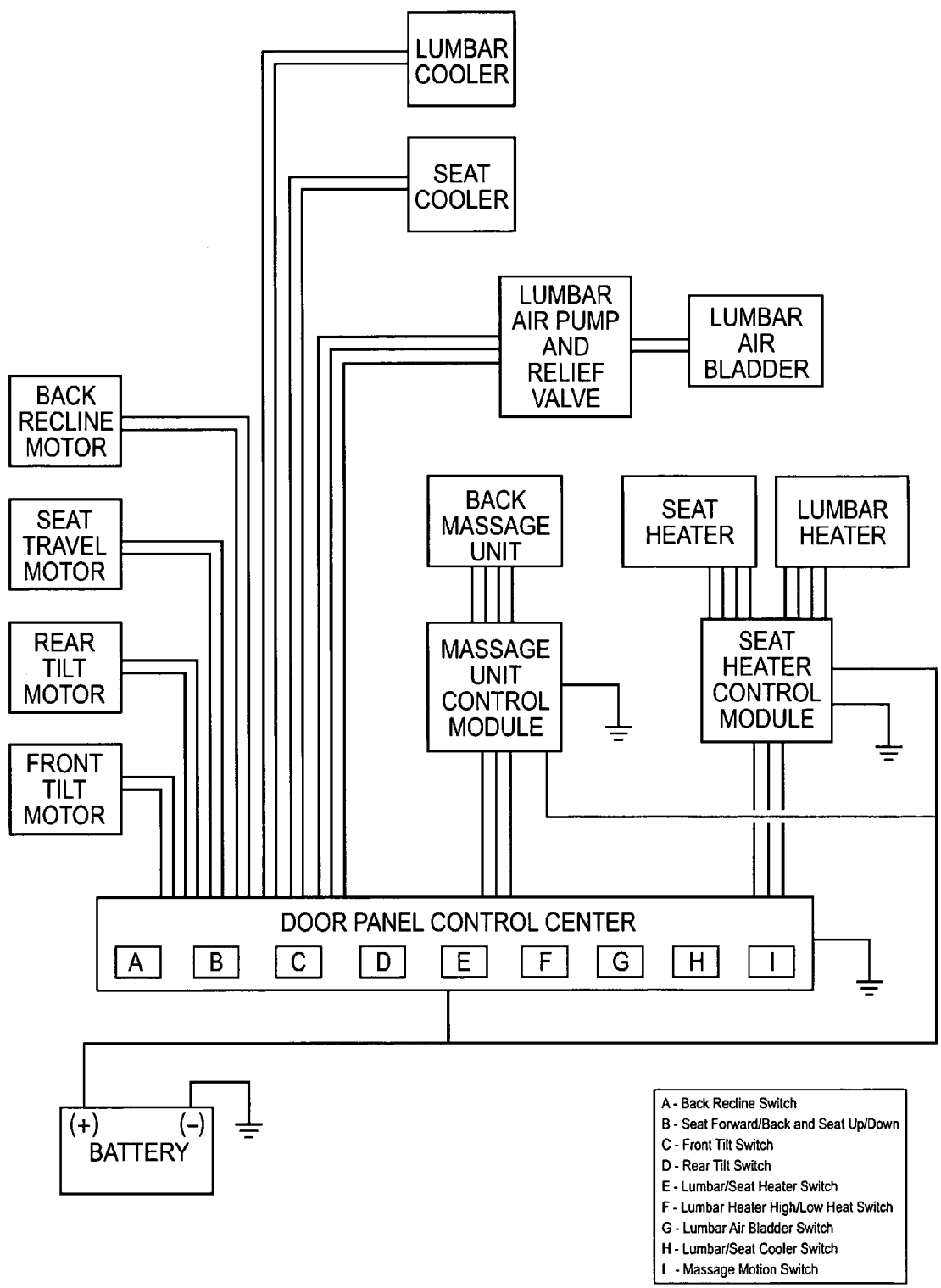
FIG. 4 is a schematic drawing of a prior art automobile seat control wiring system.
Figure 5:
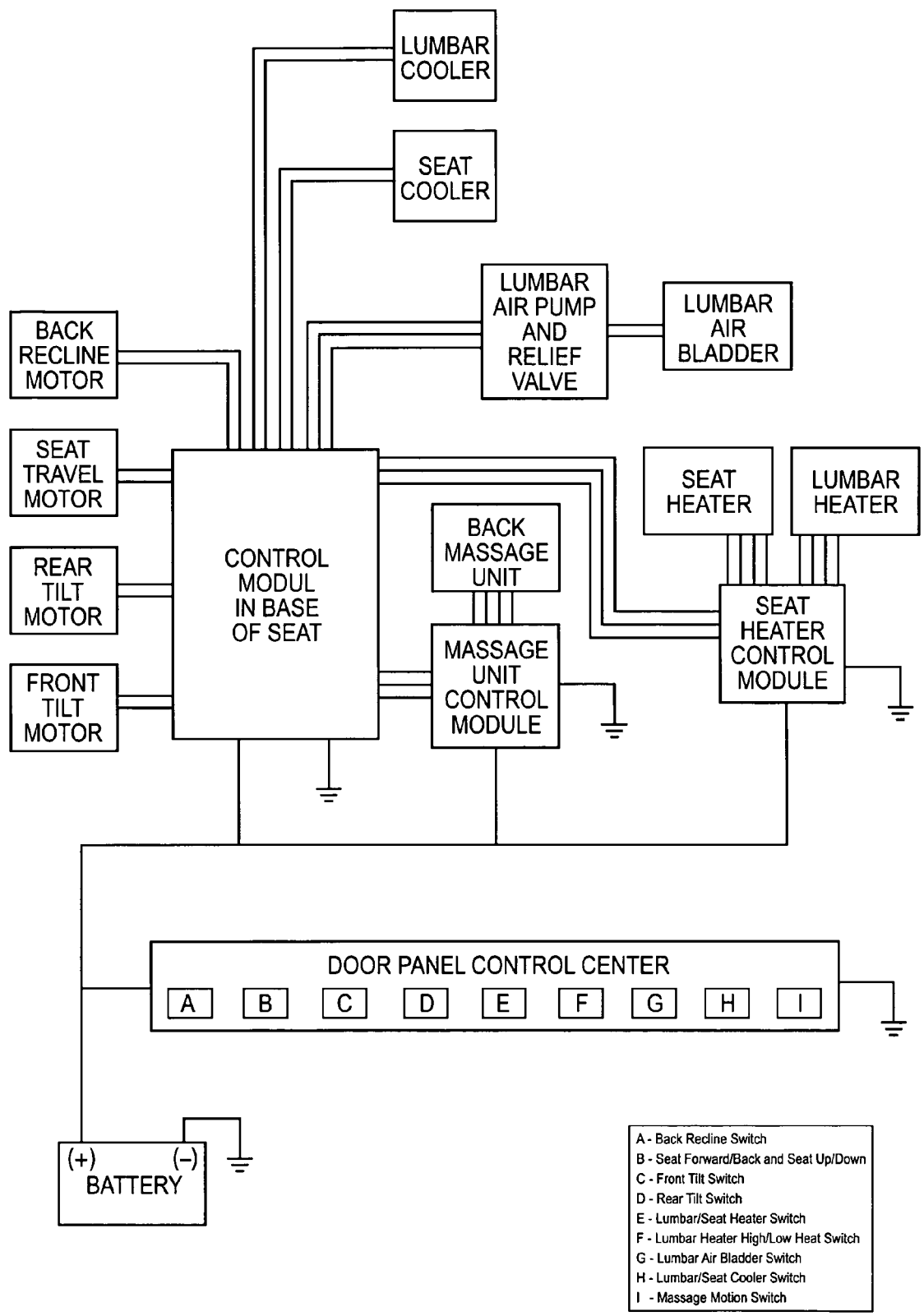
FIG. 5 is a schematic drawing of an automobile seat control wiring system using the system shown FIG. 3.

FIGS. 4 and 5 are illustrative embodiments of automobile seat control wiring. FIG. 4 illustrates a conventional prior art system employing a multiplicity of additional dedicated wires. FIG. 5 illustrates use of the system 10 of the present invention to eliminate the need for interconnecting load control wires. In the embodiment illustrated in FIG. 5, the control module serves as the output device 20 and the door panel control center serves as the input device 16. The system 10 may also be interfaced with DVD, Stereo/Radio, and security systems.

Figure 6:
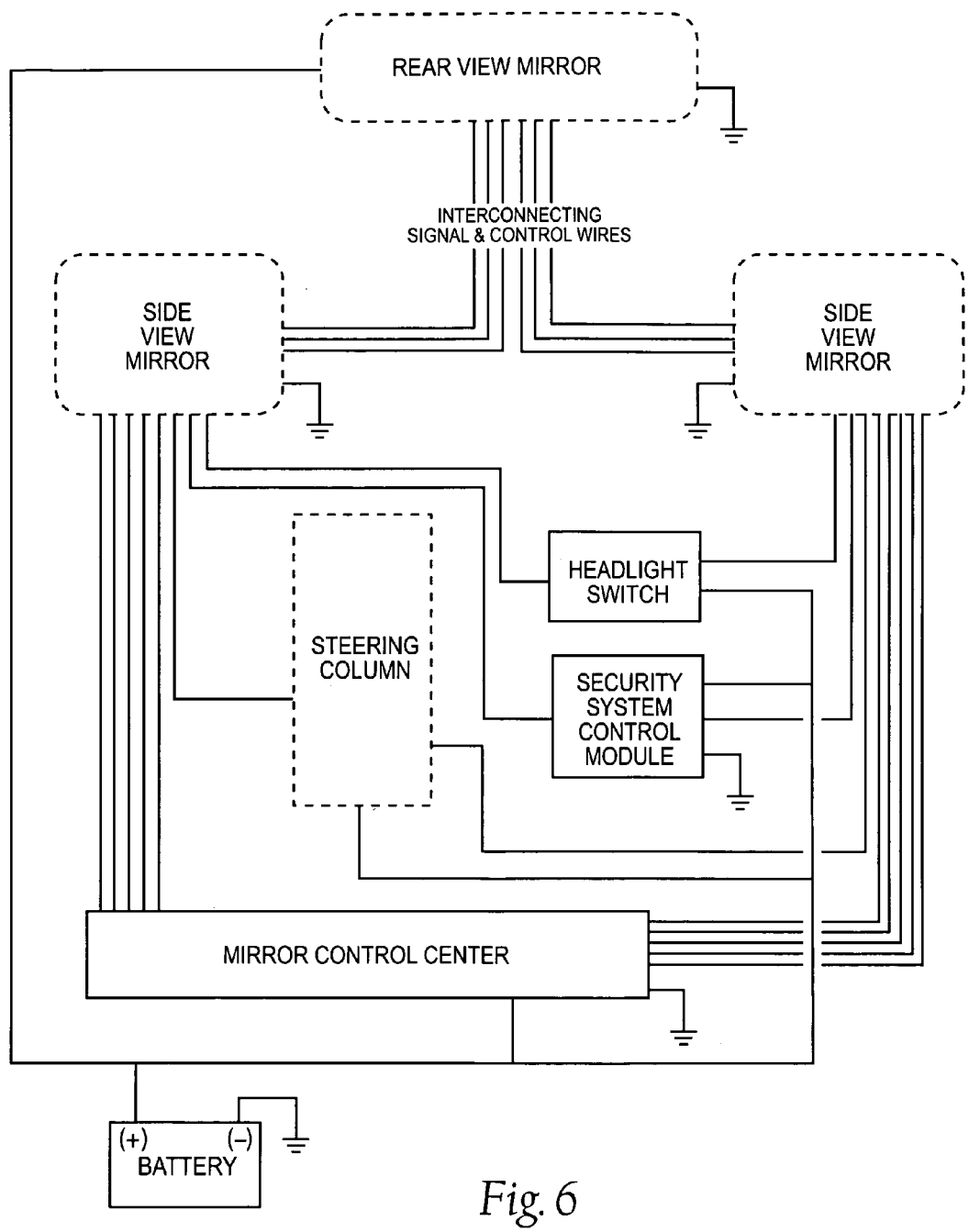
FIG. 6 is a schematic drawing of a prior art automobile mirror control wiring system.
Figure 7:
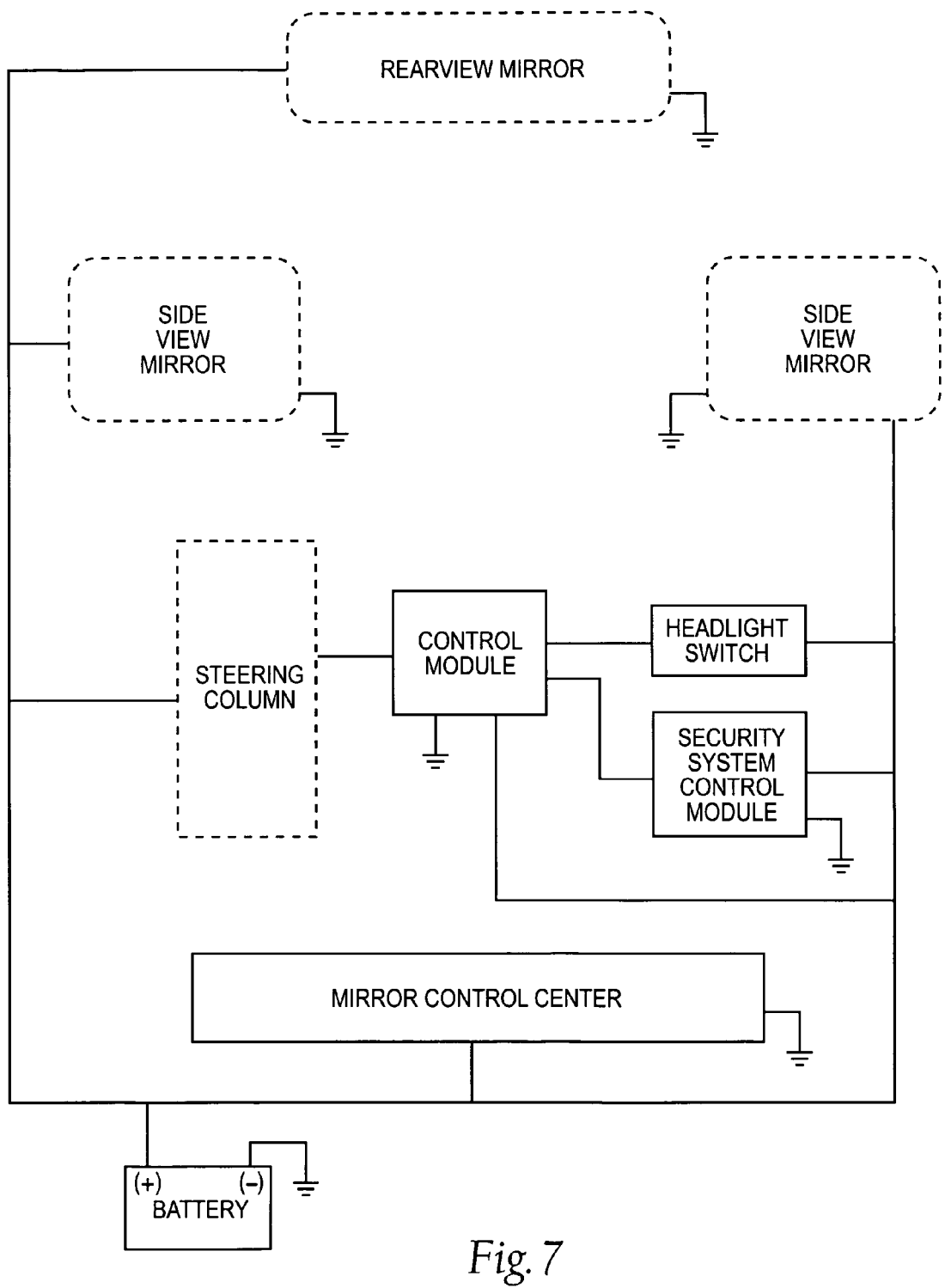
FIG. 7 is a schematic drawing of an automobile mirror control wiring system using the system shown FIG. 3.

FIGS. 6 and 7 are illustrative embodiments of automobile mirror control wiring. FIG. 6 illustrates a conventional prior art system employing a multiplicity of additional dedicated wires. FIG. 7 illustrates use of the system 10 of the present invention to eliminate the need for interconnecting load wires. The control module serves as the output device 20 and the mirror control center serves as the input device 16.

Specialty Truck:

Municipal: Switch inputs, indicators, and joysticks for controlling snow plows, salt spreaders, augers, lift mechanisms, and specialty lighting including strobes & emergency lights may be installed. The advantages over existing systems are: reduced installation time, significantly smaller in size (cab space), simplified trouble shooting, increased control capability, and improved performance.

Forestry Equipment:

Logging: The described systems and methods are well-suited for installation on vehicles and equipment used in processing lumber and log-handling. The typical wire harnesses used to operate the various mechanisms are very complex and can be difficult to troubleshoot. The systems and methods of the present invention reduce cost, simplify wiring requirements, improve system reliability, and increase operator control.

Agriculture:

The systems and methods of the present invention can be used to control the application of fertilizers and weed control liquids, hydraulics, pneumatics, pumps, seed dispensing equipment, and crop harvesting devices. With simplified wiring systems, equipment dealers can install the systems and methods of the present invention at the factory or at the dealership. Troubleshooting is greatly simplified with primary checkpoints at the controls and the modules.

Redundant System Applications:

The systems and methods of the present invention can be installed in addition to existing systems and used as a primary or backup in applications such as:

Aviation:

The simplicity and size (weight) of the systems and methods of the present invention provide a primary or backup electrical system for controls and indicators. By connecting to the system bus, the systems and methods of the present invention can be installed with existing systems and utilized as necessary. The reliability and lightweight components of the systems and methods of the present invention provide distinct advantages over conventional systems.

Recreational Vehicles:

As the complexity of a recreational vehicle's electrical system increases, the need to reduce wire harness weight and assembly time becomes more acute. The systems and methods of the present invention are ideally suited to help accomplish these goals. One example would be the use of multiple control panels connected to a power bus running the length of the vehicle. Interior lights and other devices controlled at the front of the vehicle could also be controlled at other locations in the vehicle requiring only the two wires in the power bus.

Marine:

Boats need to be as lightweight as possible to increase top end performance, reduce fuel consumption and increase cargo capacity. If a boat is loaded with features, the systems and methods of the present invention could reduce the number of interconnecting wires by 40% or more. The use of software to mimic complicated switch or relay controls can reduce the overall part count and total system cost.

Mobile Equipment:

Cranes, bulldozers, road graders, and other pieces of equipment that use large banks of electro-hydraulic valves could benefit from a less complex wire harness.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A communications system comprising
   a. an input device coupled to a power source by a load power bus, the load power bus comprising a direct current (DC) power bus; and
   b. an output device coupled to the input device and to a load by the load power bus and to the power source by a return power bus, the output device comprising
      i. a filter for receiving a command signal of a pre-determined frequency transmitted by the input device over the load power bus and filtering signals that are not of the pre-determined frequency,
      ii. a receive detector for receiving signals from the filter and determining if the signals match the pre-determined frequency and outputting a signal of the pre-determined frequency corresponding to the command,
      iii. a controller for receiving the command from the receive detector to filter out the command and,
      iv. a transmit driver downstream of the controller to prepare messages received from a main processor for injection back into the load power bus, and
      v. the main processor for communicatively receiving and sending said messages with said controller.

2. A communications system as in claim 1 wherein the message comprises a serial message comprising a group of three Bytes.

3. A communications system as in claim 2 wherein one of the Bytes indicates that a message is to be transmitted.

4. A communications system as in claim 2 wherein one of the Bytes identifies a group of targets to receive a message.

5. A communications system as in claim 2 wherein one of the Bytes corresponds to a designated command function.

6. A communications system as in claim 2 wherein said controller receives harmonic frequencies from the receive detector using software algorithms to filter out the command and construct a binary serial message for said controller.

7. A conductive emissions communications system comprising
   an input device,
   an output device communicatively coupled to the input device by a power line, the power line carrying direct current (DC) power,
   a load controlled by the output device, and
   means for transmitting a command signal from the input device to the output device over the power line without the use of a designated communications line,
   the output device including means for recognizing the command signal transmitted by the input device, means for filtering interfering signals, and means for transmitting the command signal to an output device processor without the interfering signals.

8. A conductive emissions communications system as in claim 7,
   wherein the output device includes means for processing the command signal, said command signal comprising a serial message.

9. A conductive emissions communications system as in claim 8,
   wherein the serial message comprises a group of three Bytes.

10. A conductive emissions communications system as in claim 9,
    wherein one of the Bytes indicates that a message is to be transmitted.

11. A conductive emissions communications system as in claim 9
    wherein one of the Bytes identifies a group of targets to receive a message.

12. A conductive emissions communications system as in claim 9
    wherein one of the Bytes corresponds to a designated command function.

* * * * *

UNITED STATES PATENT AND TRADEMARK OFFICE
CERTIFICATE OF CORRECTION

| | | |
|---|---|---|
| PATENT NO. | : 7,307,520 B2 | Page 1 of 1 |
| APPLICATION NO. | : 11/227376 | |
| DATED | : December 11, 2007 | |
| INVENTOR(S) | : Keith Lamon et al. | |

It is certified that error appears in the above-identified patent and that said Letters Patent is hereby corrected as shown below:

Title Page
Item (74) Attorney, Agent, or Firm– The correct name in full should read -- Ryan Kromholz & Manion, S.C.

Column 10, line 22, delete "2" and substitute -- 1 --.

Signed and Sealed this

Twelfth Day of January, 2010

David J. Kappos
*Director of the United States Patent and Trademark Office*